(12) United States Patent
Hasegawa

(10) Patent No.: US 10,979,686 B2
(45) Date of Patent: Apr. 13, 2021

(54) IMAGE DISPLAY DEVICE AND METHOD OF CORRECTING IMAGE DATA

(71) Applicant: SHARP KABUSHIKI KAISHA, Sakai (JP)

(72) Inventor: Hiroshi Hasegawa, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 85 days.

(21) Appl. No.: 16/433,882

(22) Filed: Jun. 6, 2019

(65) Prior Publication Data

US 2019/0379874 A1 Dec. 12, 2019

Related U.S. Application Data

(60) Provisional application No. 62/682,523, filed on Jun. 8, 2018.

(51) Int. Cl.
| | |
|---|---|
| *H04N 13/125* | (2018.01) |
| *H04N 5/58* | (2006.01) |
| *H04N 13/302* | (2018.01) |
| *H04N 13/398* | (2018.01) |
| *B60K 35/00* | (2006.01) |

(52) U.S. Cl.
CPC ............ *H04N 13/125* (2018.05); *H04N 5/58* (2013.01); *H04N 13/302* (2018.05); *H04N 13/398* (2018.05); *B60K 35/00* (2013.01); *B60K 2370/152* (2019.05); *B60K 2370/199* (2019.05); *B60K 2370/52* (2019.05); *B60K 2370/73* (2019.05)

(58) Field of Classification Search
CPC .. H04N 13/125; H04N 13/302; H04N 13/398; H04N 5/58; B60K 35/00; B60K 2370/152; B60K 2370/199; B60K 2370/73; B60K 2370/52
See application file for complete search history.

(56) References Cited

U.S. PATENT DOCUMENTS

| | | | |
|---|---|---|---|
| 2013/0155200 A1* | 6/2013 | Kakuko | G03B 17/565 348/49 |
| 2014/0340417 A1* | 11/2014 | Tanaka | G09G 3/3666 345/589 |

FOREIGN PATENT DOCUMENTS

| | | |
|---|---|---|
| JP | 2009-251098 A | 10/2009 |
| JP | 2011-228926 A | 11/2011 |

* cited by examiner

*Primary Examiner* — Matthew C Bella
*Assistant Examiner* — Kaleb Tessma
(74) *Attorney, Agent, or Firm* — ScienBiziP, P.C.

(57) ABSTRACT

A liquid crystal display device which is an image display device for displaying a stereoscopic image includes two correction tables (a nighttime correction table and a daytime correction table) storing correction values corresponding to combinations of a gradation value of a processing target pixel and a gradation value of an adjacent pixel, a correction table selection unit configured to select one of the two correction tables depending on conditions, and gradation value correction units (a right-image gradation value correction unit and a left-image gradation value correction unit) configured to correct the gradation value of the processing target pixel based on the correction table selected by the correction table selection unit.

3 Claims, 13 Drawing Sheets

Fig.4

| | | Gradation Value of Processing Target Pixel | | | | | | | | | | | | | | | |
|---|---|---|---|---|---|---|---|---|---|---|---|---|---|---|---|---|---|
| | | 0 | 16 | 32 | 48 | 64 | 80 | 96 | 112 | 128 | 144 | 160 | 176 | 192 | 208 | 224 | 240 | 255 |
| Gradation Value of Adjacent Pixel | 0 | 0 | 0 | 0 | 0 | 0 | 0 | 0 | 0 | 0 | 0 | 0 | 0 | 0 | 0 | 0 | 0 | 0 |
| | 16 | 0 | 0 | 0 | 0 | 0 | 0 | 0 | 0 | -1 | -1 | -1 | -1 | -1 | -1 | -1 | -1 | -1 |
| | 32 | 0 | 0 | 0 | 0 | -1 | -1 | -1 | -1 | -1 | -1 | -1 | -1 | -2 | -2 | -2 | -2 | -2 |
| | 48 | 0 | 0 | 0 | -1 | -1 | -1 | -1 | -1 | -2 | -2 | -2 | -2 | -2 | -2 | -3 | -3 | -3 |
| | 64 | 0 | 0 | -1 | -1 | -1 | -1 | -2 | -2 | -2 | -2 | -3 | -3 | -3 | -3 | -4 | -4 | -4 |
| | 80 | 0 | 0 | -1 | -1 | -1 | -2 | -2 | -2 | -3 | -3 | -3 | -3 | -4 | -4 | -4 | -5 | -5 |
| | 96 | 0 | 0 | -1 | -1 | -2 | -2 | -2 | -3 | -3 | -3 | -4 | -4 | -5 | -5 | -5 | -6 | -6 |
| | 112 | 0 | 0 | -1 | -1 | -2 | -2 | -3 | -3 | -4 | -4 | -4 | -5 | -5 | -6 | -6 | -7 | -7 |
| | 128 | 0 | -1 | -1 | -2 | -2 | -3 | -3 | -4 | -4 | -5 | -5 | -6 | -6 | -7 | -7 | -8 | -8 |
| | 144 | 0 | -1 | -1 | -2 | -2 | -3 | -3 | -4 | -5 | -5 | -6 | -6 | -7 | -7 | -8 | -8 | -9 |
| | 160 | 0 | -1 | -1 | -2 | -3 | -3 | -4 | -4 | -5 | -6 | -6 | -7 | -8 | -8 | -9 | -9 | -10 |
| | 176 | 0 | -1 | -1 | -2 | -3 | -3 | -4 | -5 | -6 | -6 | -7 | -8 | -8 | -9 | -10 | -10 | -11 |
| | 192 | 0 | -1 | -2 | -2 | -3 | -4 | -5 | -5 | -6 | -7 | -8 | -8 | -9 | -10 | -11 | -11 | -12 |
| | 208 | 0 | -1 | -2 | -2 | -3 | -4 | -5 | -6 | -7 | -7 | -8 | -9 | -10 | -11 | -11 | -12 | -13 |
| | 224 | 0 | -1 | -2 | -3 | -4 | -4 | -5 | -6 | -7 | -8 | -9 | -10 | -11 | -11 | -12 | -13 | -14 |
| | 240 | 0 | -1 | -2 | -3 | -4 | -5 | -6 | -7 | -8 | -8 | -9 | -10 | -11 | -12 | -13 | -14 | -15 |
| | 255 | 0 | -1 | -2 | -3 | -4 | -5 | -6 | -7 | -8 | -9 | -10 | -11 | -12 | -13 | -14 | -15 | -16 |

Fig.6

| | | GRADATION VALUE OF PROCESSING TARGET PIXEL |||||||||||||||||
|---|---|---|---|---|---|---|---|---|---|---|---|---|---|---|---|---|---|
| | | 0 | 16 | 32 | 48 | 64 | 80 | 96 | 112 | 128 | 144 | 160 | 176 | 192 | 208 | 224 | 240 | 255 |
| GRADATION VALUE OF ADJACENT PIXEL | 0 | 16 | 15 | 14 | 13 | 12 | 11 | 10 | 9 | 8 | 7 | 6 | 5 | 4 | 3 | 2 | 1 | 0 |
| | 16 | 15 | 14 | 13 | 12 | 11 | 10 | 9 | 8 | 8 | 7 | 6 | 5 | 4 | 3 | 2 | 1 | 0 |
| | 32 | 14 | 13 | 12 | 11 | 11 | 10 | 9 | 8 | 7 | 6 | 5 | 4 | 4 | 3 | 2 | 1 | 0 |
| | 48 | 13 | 12 | 11 | 11 | 10 | 9 | 8 | 7 | 7 | 6 | 5 | 4 | 3 | 2 | 2 | 1 | 0 |
| | 64 | 12 | 11 | 11 | 10 | 9 | 8 | 8 | 7 | 6 | 5 | 5 | 4 | 3 | 2 | 2 | 1 | 0 |
| | 80 | 11 | 10 | 10 | 9 | 8 | 8 | 7 | 6 | 6 | 5 | 4 | 3 | 3 | 2 | 1 | 1 | 0 |
| | 96 | 10 | 9 | 9 | 8 | 8 | 7 | 6 | 6 | 5 | 4 | 4 | 3 | 3 | 2 | 1 | 1 | 0 |
| | 112 | 9 | 8 | 8 | 7 | 7 | 6 | 6 | 5 | 5 | 4 | 4 | 3 | 3 | 2 | 2 | 1 | 0 |
| | 128 | 8 | 8 | 7 | 7 | 6 | 6 | 5 | 5 | 4 | 4 | 3 | 3 | 2 | 2 | 1 | 1 | 0 |
| | 144 | 7 | 7 | 6 | 6 | 5 | 5 | 4 | 4 | 4 | 3 | 3 | 2 | 2 | 1 | 1 | 0 | 0 |
| | 160 | 6 | 6 | 5 | 5 | 5 | 4 | 4 | 3 | 3 | 3 | 2 | 2 | 2 | 1 | 1 | 0 | 0 |
| | 176 | 5 | 5 | 5 | 4 | 4 | 4 | 3 | 3 | 3 | 3 | 2 | 2 | 2 | 1 | 1 | 0 | 0 |
| | 192 | 4 | 4 | 4 | 4 | 3 | 3 | 3 | 3 | 2 | 2 | 2 | 2 | 1 | 1 | 1 | 0 | 0 |
| | 208 | 3 | 3 | 3 | 3 | 2 | 2 | 2 | 2 | 2 | 1 | 1 | 1 | 1 | 1 | 0 | 0 | 0 |
| | 224 | 2 | 2 | 2 | 2 | 2 | 2 | 1 | 1 | 1 | 1 | 1 | 1 | 0 | 0 | 0 | 0 | 0 |
| | 240 | 1 | 1 | 1 | 1 | 1 | 1 | 1 | 1 | 0 | 0 | 0 | 0 | 0 | 0 | 0 | 0 | 0 |
| | 255 | 0 | 0 | 0 | 0 | 0 | 0 | 0 | 0 | 0 | 0 | 0 | 0 | 0 | 0 | 0 | 0 | 0 |

IMAGE DISPLAY DEVICE AND METHOD OF CORRECTING IMAGE DATA

CROSS REFERENCE TO RELATED APPLICATIONS

This application claims priority to U.S. Provisional Patent Application No. 62/682,523, entitled "IMAGE DISPLAY DEVICE AND METHOD OF CORRECTING IMAGE DATA", filed on Jun. 8, 2018, the content of which is incorporated herein by reference.

BACKGROUND OF THE INVENTION

1. Field of the Invention

The following disclosure relates to an image display device, and more particularly, to a technique of suppressing occurrence of crosstalk in an image display device for displaying a stereoscopic image.

2. Description of Related Art

Conventionally, image display devices having a function of stereoscopically displaying an image are known. With an image display device adopting a parallax barrier method as a method of displaying a stereoscopic image, left-eye pixels and right-eye pixels are provided in a display unit, and different images are displayed in the left-eye pixels and the right-eye pixels. Because parallax is present for human eyes, a viewer is enabled to stereoscopically recognize an image by display of appropriate images in the left-eye pixels and the right-eye pixels.

With respect to such an image display device which displays a stereoscopic image, it is conventionally aimed to suppress occurrence of crosstalk. Crosstalk is a phenomenon in which an image is viewed in a state where a left-eye image and a right-eye image are overlapped with each other because of the left-eye image being captured also by a right eye of a viewer and the right-eye image being captured also by a left eye of the viewer. Crosstalk causes reduction in image quality, and may also cause eye strain.

A crosstalk value representing a level of crosstalk will be described with reference to FIG. 12. In FIG. 12, a curved line denoted by a reference sign 90 represents a distribution of luminance when an image 190 with a white left-eye image and a black right-eye image is displayed, a curved line denoted by a reference sign 91 represents a distribution of luminance when an image 191 with a black left-eye image and a white right-eye image is displayed, and a curved line denoted by a reference sign 92 represents a distribution of luminance when an image 192 with a black left-eye image and a black right-eye image is displayed. It should be noted that, in FIG. 12, an angle on a right-eye side from a center is positive, and an angle on a left-eye side from the center is negative.

A crosstalk value VC(L) at any angle $\theta_L$ on the left-eye side is determined by the following Equation (1), and a crosstalk value VC(R) at any angle $\theta_R$ on the right-eye side is determined by the following Equation (2).

$$VC(L) = \frac{LB(\theta_L) - BB(\theta_L)}{LW(\theta_L) - BB(\theta_L)} \times 100 \quad (1)$$

$$VC(R) = \frac{RB(\theta_R) - BB(\theta_R)}{RW(\theta_R) - BB(\theta_R)} \times 100 \quad (2)$$

In Equation (1), $LW(\theta_L)$ represents luminance at the angle $\theta_L$ when the image 190 is displayed, $LB(\theta_L)$ represents luminance at the angle $\theta_L$ when the image 191 is displayed, and $BB(\theta_L)$ represents luminance at the angle $\theta$, when the image 192 is displayed. In the same manner, in Equation (2), $RW(\theta_R)$ represents luminance at the angle $\theta_R$ when the image 191 is displayed, $RB(\theta_R)$ represents luminance at the angle $\theta_R$ when the image 190 is displayed, and $BB(\theta_R)$ represents luminance at the angle $\theta_R$ when the image 192 is displayed.

A maximum crosstalk value VC (L) when all possible angles are substituted in $\theta_L$ in Equation (1) is taken as a left crosstalk value, and a maximum crosstalk value VC(R) when all possible angles are substituted in $\theta_R$ in Equation (2) is taken as a right crosstalk value. A viewer may view a more desirable stereoscopic image as the left crosstalk value and the right crosstalk value become smaller.

Next, a conventional method of suppressing occurrence of crosstalk will be described. Here, the attention is paid to a certain right-eye pixel R and left-eye pixels L(L), L(R) that are adjacent on left and right of the right-eye pixel R (hereinafter referred to as "adjacent pixel(s)") (see FIGS. 13 to 15 and FIG. 17). In the case where the right-eye pixel R is gray, and the adjacent pixels L(L), L(R) are white, since light of the adjacent pixels L(L), L(R) leaks to the right-eye pixel R, display luminance of the right-eye pixel R becomes higher than luminance based on an input signal as shown in FIG. 13. It should be noted that a dotted line denoted by a reference sign 93 represents a level of target display luminance, and a shaded part represents an increase in the luminance due to crosstalk. In relation to such a phenomenon, a gradation value of the input signal is corrected to a value which is smaller by a gradation value corresponding to luminance of light leaking from adjacent pixels (hereinafter, such a method will be referred to as "first correction method" for the sake of convenience). According to the first correction method, in the example described above, a gradation value of the right-eye pixel R in the input signal is corrected to a value that is smaller than an original value by taking into account leakage of light from the adjacent pixels L(L), L(R) as shown in FIG. 14. As a result, the display luminance of the right-eye pixel R substantially matches the target display luminance. Occurrence of crosstalk is suppressed in this manner.

However, with respect to black color, the gradation value of an input signal cannot be corrected to a value that is smaller than an original value. Accordingly, as shown in FIG. 15, the first correction method is not able to prevent occurrence of crosstalk in a case where the right-eye pixel R is black (the level of the target display luminance is indicated by a dotted line denoted by a reference sign 94) and the adjacent pixels L(L), L(R) are white.

Accordingly, there is proposed a method of increasing the level of display luminance of black (i.e., of raising a lower limit of display luminance) as shown in FIG. 16 so as to enable correction of the gradation value of an input signal such that occurrence of crosstalk is suppressed also for a black part (hereinafter, such a method will be referred to as "second correction method" for the sake of convenience). According to the second correction method, the display luminance of the right-eye pixel R substantially matches the target display luminance as shown in FIG. 17, in a case where the right-eye pixel R is black and the adjacent pixels L(L), L(R) are white (in FIG. 17, the level of the target display luminance is indicated by a dotted line denoted by a reference sign 95).

Following prior art documents are known in relation to the present application. Japanese Laid-Open Patent Publication No. 2009-251098 describes the first correction method and the second correction method described above. Japanese Laid-Open Patent Publication No. 2011-228926 describes preparing two gain tables for correcting luminance of an input signal, and changing an internal division ratio of the two gain tables depending on environment.

However, according to the second correction method, because the lower limit of the display luminance is raised, a phenomenon called "black floating" is caused by which a black part is displayed brighter than it really is. Contrast is thereby reduced, and thus, an image quality is drastically reduced especially in a dark environment. Moreover, as described above, according to the first correction method, occurrence of crosstalk cannot be prevented at a black part.

SUMMARY OF THE INVENTION

Accordingly, with respect to an image display device having a function of displaying a stereoscopic image, it is desired to more effectively suppress occurrence of crosstalk than in a conventional case.

(1) Image display devices according to several embodiments of the present invention are each an image display device including a display unit including a plurality of right-eye pixels for displaying a right-eye image and a plurality of left-eye pixels for displaying a left-eye image, the image display device being for displaying a stereoscopic image based on image data including gradation values of a plurality of pixels including the plurality of right-eye pixels and the plurality of left-eye pixels, the image display device including:

a plurality of correction tables storing correction values corresponding to combinations of a gradation value of a processing target pixel and a gradation value of an adjacent pixel that is a pixel adjacent to the processing target pixel;

a correction table selection unit configured to select one correction table from the plurality of correction tables depending on conditions; and a gradation value correction unit configured to take the plurality of pixels one by one as the processing target pixel, and to correct the gradation value of the processing target pixel based on the correction table selected by the correction table selection unit.

According to such a configuration, the image display device holds the plurality of correction tables for correcting the gradation value of the image data, and the correction table to be actually used at the time of correcting the gradation value is selected depending on conditions. Accordingly, by storing correction values depending on conditions in each of the plurality of correction tables, preferable correction depending on the conditions is performed on the gradation value of the image data. Therefore, in the image display device having the function of displaying a stereoscopic image, occurrence of crosstalk can be more effectively suppressed than in a conventional case.

(2) Moreover, image display devices according to several embodiments of the present invention are each an image display device including the configuration of above (1), wherein
the plurality of correction tables include a first correction table and a second correction table, and the first correction table and the second correction table correspond respectively to one and other of two methods of suppressing crosstalk at a time of display of the stereoscopic image on the display unit.

(3) Moreover, image display devices according to several embodiments of the present invention are each an image display device including the configuration of above (2), wherein the first correction table stores a correction value such that a gradation value after correction becomes equal to or smaller than the gradation value before correction, a difference between the gradation value after correction and the gradation value before correction becomes relatively greater as the gradation value of the adjacent pixel becomes greater, and the difference between the gradation value after correction and the gradation value before correction becomes relatively greater as the gradation value of the processing target pixel becomes greater, and the second correction table stores a correction value such that the gradation value after correction becomes equal to or greater than the gradation value before correction, the difference between the gradation value after correction and the gradation value before correction becomes relatively greater as the gradation value of the adjacent pixel becomes smaller, and the difference between the gradation value after correction and the gradation value before correction becomes relatively greater as the gradation value of the processing target pixel becomes smaller.

(4) Moreover, image display devices according to several embodiments of the present invention are each an image display device including the configuration of above (3), wherein the image display device is mounted in a vehicle, and the correction table selection unit selects the first correction table when a light of the vehicle is on, and selects the second correction table when the light of the vehicle is off.

(5) Moreover, image display devices according to several embodiments of the present invention are each an image display device including the configuration of above (3), wherein the correction table selection unit selects the first correction table during hours from sunset to sunrise, and selects the second correction table during hours from sunrise to sunset.

(6) Moreover, image display devices according to several embodiments of the present invention are each an image display device including, in addition to the configuration of above (3), an illuminance detection unit configured to detect illuminance indicating surrounding brightness, wherein the correction table selection unit selects the first correction table when the illuminance detected by the illuminance detection unit is smaller than a predetermined threshold, and selects the second correction table when the illuminance detected by the illuminance detection unit is greater than the predetermined threshold.

(7) Moreover, image display devices according to several embodiments of the present invention are each an image display device including, in addition to the configuration of above (3), a screen luminance adjustment unit configured to adjust screen luminance indicating brightness of the display unit, wherein the correction table selection unit selects the first correction table when the screen luminance is set by the screen luminance adjustment unit to a value smaller than a predetermined threshold, and selects the second correction table when the screen luminance is set by the screen luminance adjustment unit to a value greater than the predetermined threshold.

(8) Moreover, correction methods for image data in several embodiments of the present invention are each a correction method for image data for displaying a stereoscopic image, the image data including gradation values of a plurality of pixels including a plurality of right-eye pixels for displaying a right-eye image and a plurality of left-eye pixels for displaying a left-eye image, the correction method including:

a correction table selection step of selecting, depending on conditions, one correction table from a plurality of correction tables storing correction values corresponding to combinations of a gradation value of a processing target pixel and a gradation value of an adjacent pixel that is a pixel adjacent to the processing target pixel; and a gradation value correction step of taking the plurality of pixels one by one as the processing target pixel, and of correcting the gradation value of the processing target pixel based on the correction table selected in the correction table selection step.

These and other objects, features, aspects, and effects of the present invention will be made more clear from the following detailed description of the present invention with reference to the accompanying drawings.

BRIEF DESCRIPTION OF THE DRAWINGS

FIG. 4 is a schematic diagram showing an example of a nighttime correction table according to the embodiment.

FIG. 6 is a schematic diagram showing an example of a daytime correction table according to the embodiment.

DETAILED DESCRIPTION OF PREFERRED EMBODIMENTS

Hereinafter, an embodiment will be described with reference to the drawings.

1. Overall Configuration and Outline of Operation

Figure 2:
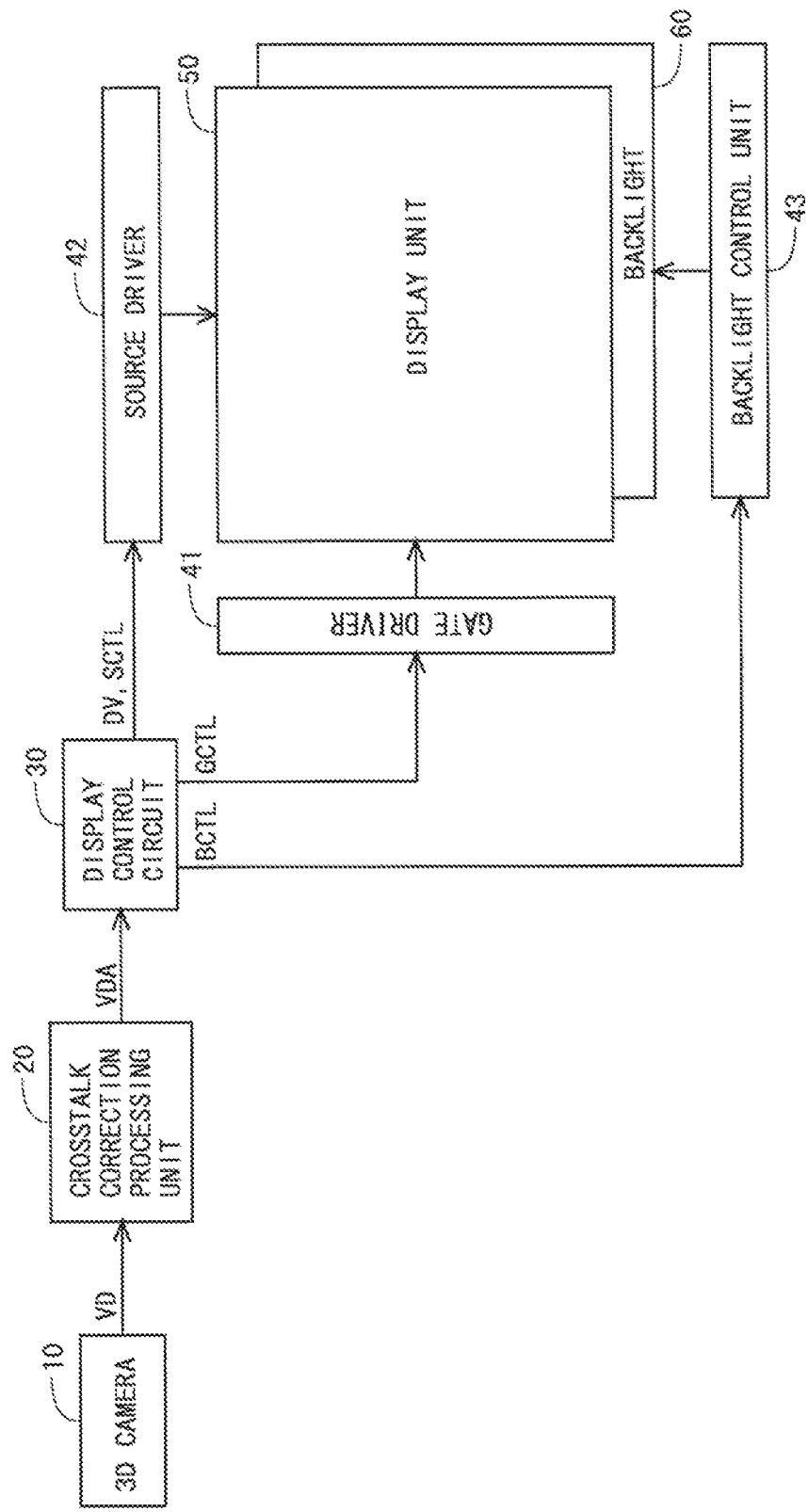
FIG. 2 is a block diagram showing an overall configuration of a liquid crystal display device according to the embodiment.

FIG. 2 is a block diagram showing an overall configuration of a liquid crystal display device according to an embodiment. The liquid crystal display device is an image display device which is capable of displaying a stereoscopic image. As shown in FIG. 2, the liquid crystal display device includes a 3D camera 10, a crosstalk correction processing unit 20, a display control circuit 30, a gate driver 41, a source driver 42, a backlight control unit 43, a display unit 50, and a backlight 60. The liquid crystal display device is assumed to be capable of gradation display in 256 scales. Furthermore, the liquid crystal display device is assumed to be mounted in a vehicle such as an automobile, a bus, or a truck.

Figure 3:
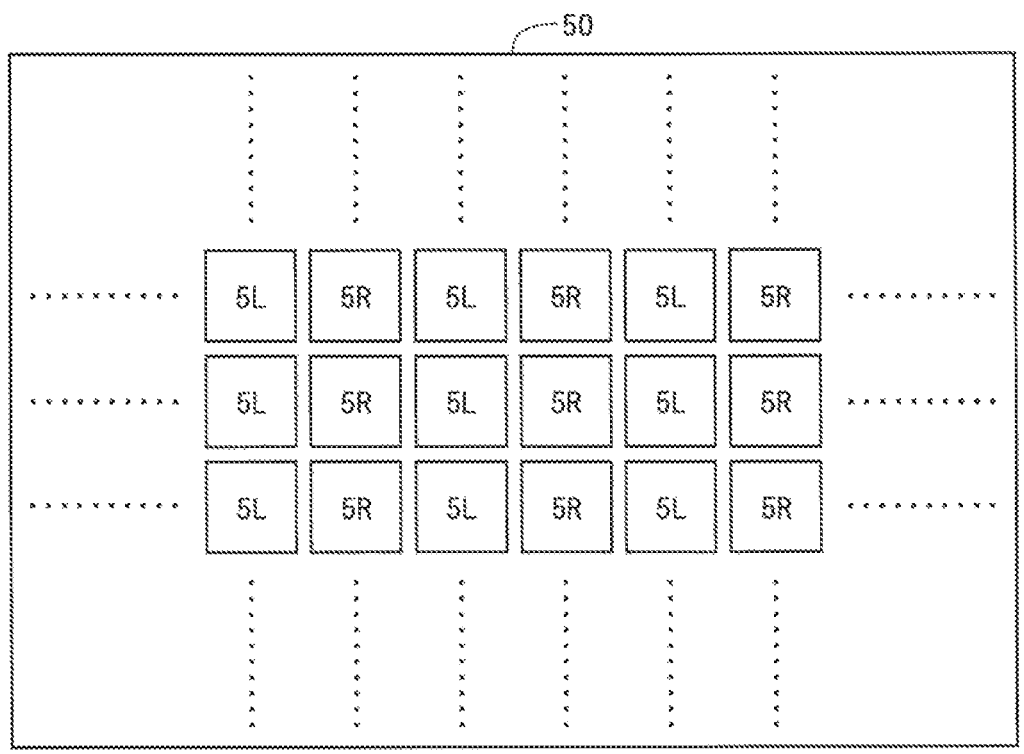
FIG. 3 is a diagram for describing an arrangement of pixels according to the embodiment.

As shown in FIG. 3, the display unit 50 includes a plurality of pixels including a plurality of left-eye pixels 5L for displaying a left-eye image, and a plurality of right-eye pixels 5R for displaying a right-eye image. The left-eye pixels 5L and the right-eye pixels 5R are alternately disposed in a left-right direction. Furthermore, a plurality of source bus lines (video signal lines) SL and a plurality of gate bus lines (scanning signal lines) GL are arranged in the display unit 50. The pixels described above are provided at respective intersecting points of the plurality of source bus lines SL and the plurality of gate bus lines GL.

The 3D camera 10 captures a left-eye image and a right-eye image, and outputs image data VD obtained by the capturing. It should be noted that an example of using the image data VD obtained by capturing by the 3D camera 10 is described herein, but the present invention is not limited to this, and the present invention may also be applied to a case of using image data (image data including left-eye image data and right-eye image data) that is transmitted from outside.

The crosstalk correction processing unit 20 performs correction of the image data VD outputted from the 3D camera 10, so as to suppress occurrence of crosstalk. Then, the crosstalk correction processing unit 20 outputs corrected image data VDA. It should be noted that a detailed description of the crosstalk correction processing unit 20 will be given later.

The display control circuit 30 receives the image data VDA transmitted from the crosstalk correction processing unit 20, and outputs a digital video signal DV, a gate control signal GCTL for controlling operation of the gate driver 41, a source control signal SCTL for controlling operation of the source driver 42, and a backlight control signal BCTL for controlling operation of the backlight control unit 43.

The gate driver 41 repeatedly applies an active scanning signal to each gate bus line with one vertical scanning period as a cycle, based on the gate control signal GCTL transmitted from the display control circuit 30. The source driver 42 receives the digital video signal DV and the source control signal SCTL transmitted from the display control circuit 30, and applies a driving video signal to each source bus line. The backlight control unit 43 controls a lighting state of the backlight 60 based on the backlight control signal BCTL transmitted from the display control circuit 30.

In this manner, a stereoscopic image is displayed on the display unit 50 by application of a scanning signal to the gate bus line, application of a driving video signal to the source bus line, and control of the lighting state of the backlight 60.

2. Crosstalk Correction Processing Unit

Next, a detailed description of the crosstalk correction processing unit 20 will be given.

2.1 Outline

Figure 1:
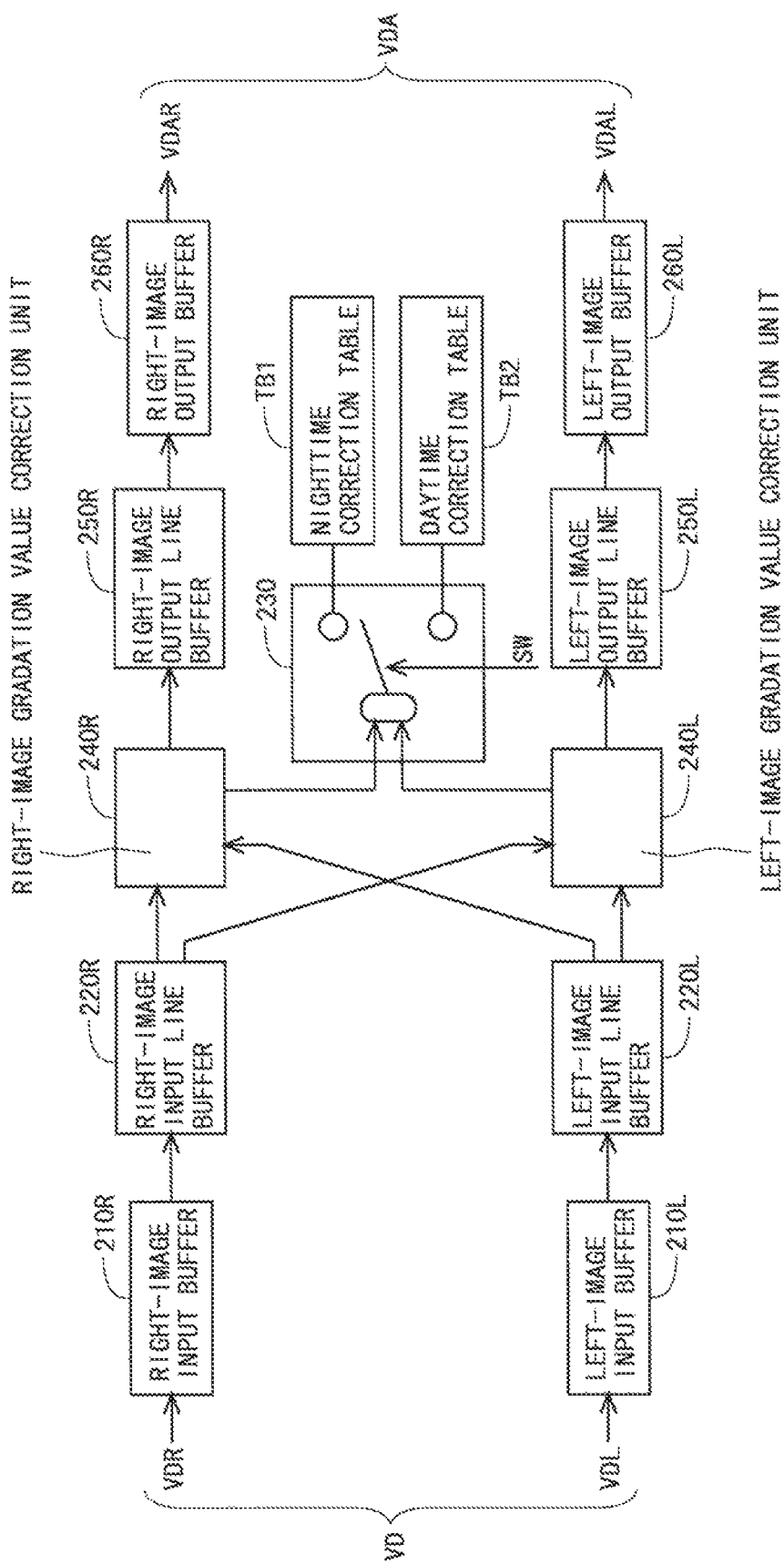
FIG. 1 is a block diagram showing a detailed configuration of a crosstalk correction processing unit according to an embodiment.

FIG. 1 is a block diagram showing a detailed configuration of the crosstalk correction processing unit 20. As shown in FIG. 1, the crosstalk correction processing unit 20 includes a right-image input buffer 210R, a left-image input buffer 210L, a right-image input line buffer 220R, a left-image input line buffer 220L, a correction table selection unit 230, a right-image gradation value correction unit 240R, a left-image gradation value correction unit 240L, a right-image output line buffer 250R, a left-image output line buffer 250L, a right-image output buffer 260R, a left-image output buffer 260L, a nighttime correction table TB1, and a daytime correction table TB2. The nighttime correction table TB1 and the daytime correction table TB2 are tables for correcting a gradation value of the image data VD such that occurrence of crosstalk is suppressed. It should be noted that the right-image gradation value correction unit 240R and the left-image gradation value correction unit 240L will be collectively and simply referred to as "gradation value correction unit(s)".

The image data VD obtained by capturing by the 3D camera 10 is configured of right-eye image data VDR and left-eye image data VDL. The right-eye image data VDR is stored in the right-image input buffer 210R, and the left-eye image data VDL is stored in the left-image input buffer 210L. The right-eye image data VDR is transferred from the right-image input buffer 210R to the right-image input line buffer 220R on a per-line basis. In the same manner, the left-eye image data VDL is transferred from the left-image input buffer 210L to the left-image input line buffer 220L on a per-line basis.

The correction table selection unit 230 switches, based on a switching signal SW, the correction table to be actually used at the time of correcting the gradation value between the nighttime correction table TB1 and the daytime correction table TB2. That is, the correction table selection unit 230 selects one of the nighttime correction table TB1 or the daytime correction table TB2 depending on conditions. Switching of the correction table will be described later in detail.

The right-image gradation value correction unit 240R takes the right-eye pixels 5R as a processing target pixel one by one, and corrects the gradation value of the processing target pixel based on the correction table selected by the correction table selection unit 230. At this time, the gradation value of the processing target pixel before correction is acquired from the right-image input line buffer 220R, and the gradation values of adjacent pixels (pixels that are adjacent on the left and right of the processing target pixel) necessary to determine a correction value (correction amount) are acquired from the left-image input line buffer 220L. In the same manner, the left-image gradation value correction unit 240L takes the left-eye pixels 5L as a processing target pixel one by one, and corrects the gradation value of the processing target pixel based on the correction table selected by the correction table selection unit 230.

The corrected data obtained by processing by the right-image gradation value correction unit 240R is accumulated in the right-image output line buffer 250R, and data for one line accumulated in the right-image output line buffer 250R is transferred to the right-image output buffer 260R. The corrected data obtained by processing by the left-image gradation value correction unit 240L is accumulated in the left-image output line buffer 250L, and data for one line accumulated in the left-image output line buffer 250L is transferred to the left-image output buffer 260L.

When processing by the right-image gradation value correction unit 240R and the left-image gradation value correction unit 240L for one screen is ended, corrected data for one screen is accumulated in the right-image output buffer 260R and the left-image output buffer 260L. Right-eye image data VDAR, which is data for one screen accumulated in the right-image output buffer 260R, and left-eye image data VDAL, which is data for one screen accumulated in the left-image output buffer 260L, are transmitted to the display control circuit 30 as the corrected image data VDA described above.

The correction tables used in the present embodiment are described below. As shown in FIG. 1, as tables for correcting the gradation value of the image data VD, the nighttime correction table TB1 and the daytime correction table TB2 are prepared. In the present embodiment, the first correction method and the second correction method described above are adopted as the methods of suppressing occurrence of crosstalk. The nighttime correction table TB1 is a table corresponding to the first correction method, and the daytime correction table TB2 is a table corresponding to the second correction method.

FIG. 4 is a schematic diagram showing an example of the nighttime correction table TB1. As can be seen in FIG. 4, the nighttime correction table TB1 stores correction values, each corresponding to a combination of the gradation value of a processing target pixel and the gradation value of an adjacent pixel. For example, in the case where the gradation value of a processing target pixel is 128, and the gradation value of an adjacent pixel is 176, the correction value is −6. As described later, at the time of correction of the gradation value, the correction value is added to the gradation value of the processing target pixel. It should be noted that the adjacent pixel is present on the left and right of the processing target pixel, and thus, two correction values are added to the gradation value of the processing target pixel.

The correction value that is stored in the nighttime correction table TB1 is 0 or a negative number. That is, the nighttime correction table TB1 stores correction values by which a gradation value after correction becomes equal to or smaller than the gradation value before correction.

Furthermore, although the correction value is 0 regardless of the gradation value of the adjacent pixel in the case where the gradation value of the processing target pixel is 0, for example, the correction value is gradually reduced from 0 to −8 (an absolute value of the correction value is gradually increased from 0 to 8) as the gradation value of the adjacent pixel becomes greater in the case where the gradation value of the processing target pixel is 128, and the correction value is gradually reduced from 0 to −16 (the absolute value of the correction value is gradually increased from 0 to 16) as the gradation value of the adjacent pixel becomes greater in the case where the gradation value of the processing target pixel is 255. In this manner, the nighttime correction table TB1 stores correction values by which a difference between the gradation value after correction and the gradation value before correction becomes relatively greater as the gradation value of the adjacent pixel becomes greater.

Furthermore, although the correction value is 0 regardless of the gradation value of the processing target pixel in the case where the gradation value of the adjacent pixel is 0, for example, the correction value is gradually reduced from 0 to −8 (an absolute value of the correction value is gradually increased from 0 to 8) as the gradation value of the processing target pixel becomes greater in the case where the gradation value of the adjacent pixel is 128, and the correction value is gradually reduced from 0 to −16 (the absolute value of the correction value is gradually increased from 0 to 16) as the gradation value of the processing target pixel becomes greater in the case where the gradation value of the adjacent pixel is 255. In this manner, the nighttime correction table TB1 stores correction values by which a difference between the gradation value after correction and the gradation value before correction becomes relatively greater as the gradation value of the processing target pixel becomes greater.

Figure 5:
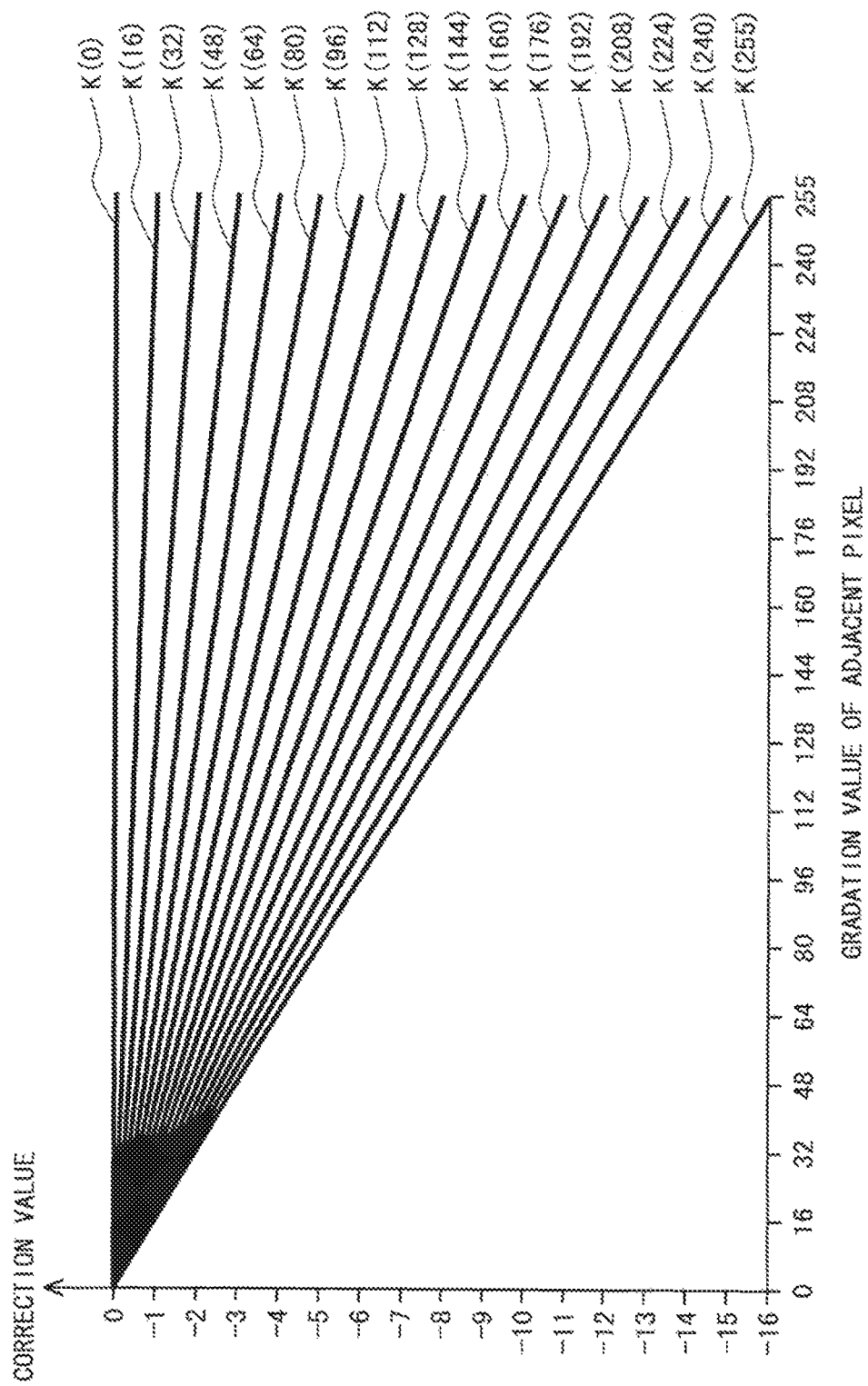
FIG. 5 is a diagram showing a relationship between a gradation value of an adjacent pixel and a correction value in the nighttime correction table, for each gradation value of a processing target pixel, regarding the embodiment.

FIG. 5 is a diagram showing a relationship between the gradation value of the adjacent pixel and the correction value in the nighttime correction table TB1, for each gradation value of the processing target pixel. In FIG. 5, the horizontal axis indicates the gradation value of the adjacent pixel, and the vertical axis indicates the correction value. In FIG. 5, for example, a solid line denoted by a reference sign K(64) represents a relationship between the gradation value of the adjacent pixel and the correction value in a case where the gradation value of the processing target pixel is 64. As can be seen in FIG. 5, the greater the gradation value of the adjacent pixel, the relatively greater a correction amount (the absolute value of the correction value), and the greater the gradation value of the processing target pixel, the relatively greater the correction amount. That is, as described above, the nighttime correction table TB1 stores correction values by which the difference between the gradation value after correction and the gradation value before correction is relatively increased as the gradation value of the adjacent pixel becomes greater, and by which the difference between the gradation value after correction and the gradation value before correction is relatively increased as the gradation value of the processing target pixel becomes greater.

FIG. 6 is a schematic diagram showing an example of the daytime correction table TB2. As can be seen in FIG. 6, like the nighttime correction table TB1, the daytime correction table TB2 stores correction values each corresponds to a combination of the gradation value of a processing target pixel and the gradation value of an adjacent pixel. The correction value that is stored in the daytime correction table TB2 is 0 or a positive number. That is, the daytime correction table TB2 stores correction values by which the gradation value after correction becomes equal to or greater than the gradation value before correction.

Furthermore, although the correction value is 0 regardless of the gradation value of the adjacent pixel in the case where the gradation value of the processing target pixel is 255, for example, the correction value is gradually increased from 0 to 8 as the gradation value of the adjacent pixel becomes smaller in the case where the gradation value of the processing target pixel is 128, and the correction value is gradually increased from 0 to 16 as the gradation value of the adjacent pixel becomes smaller in the case where the gradation value of the processing target pixel is 0. In this manner, the daytime correction table TB2 stores correction values by which a difference between the gradation value after correction and the gradation value before correction becomes relatively greater as the gradation value of the adjacent pixel becomes smaller.

Furthermore, although the correction value is 0 regardless of the gradation value of the processing target pixel in the case where the gradation value of the adjacent pixel is 255, for example, the correction value is gradually increased from 0 to 8 as the gradation value of the processing target pixel becomes smaller in the case where the gradation value of the adjacent pixel is 128, and the correction value is gradually increased from 0 to 16 as the gradation value of the processing target pixel becomes smaller in the case where the gradation value of the adjacent pixel is 0. In this manner, the daytime correction table TB2 stores correction values by which a difference between the gradation value after correction and the gradation value before correction becomes relatively greater as the gradation value of the processing target pixel becomes smaller.

Figure 7:
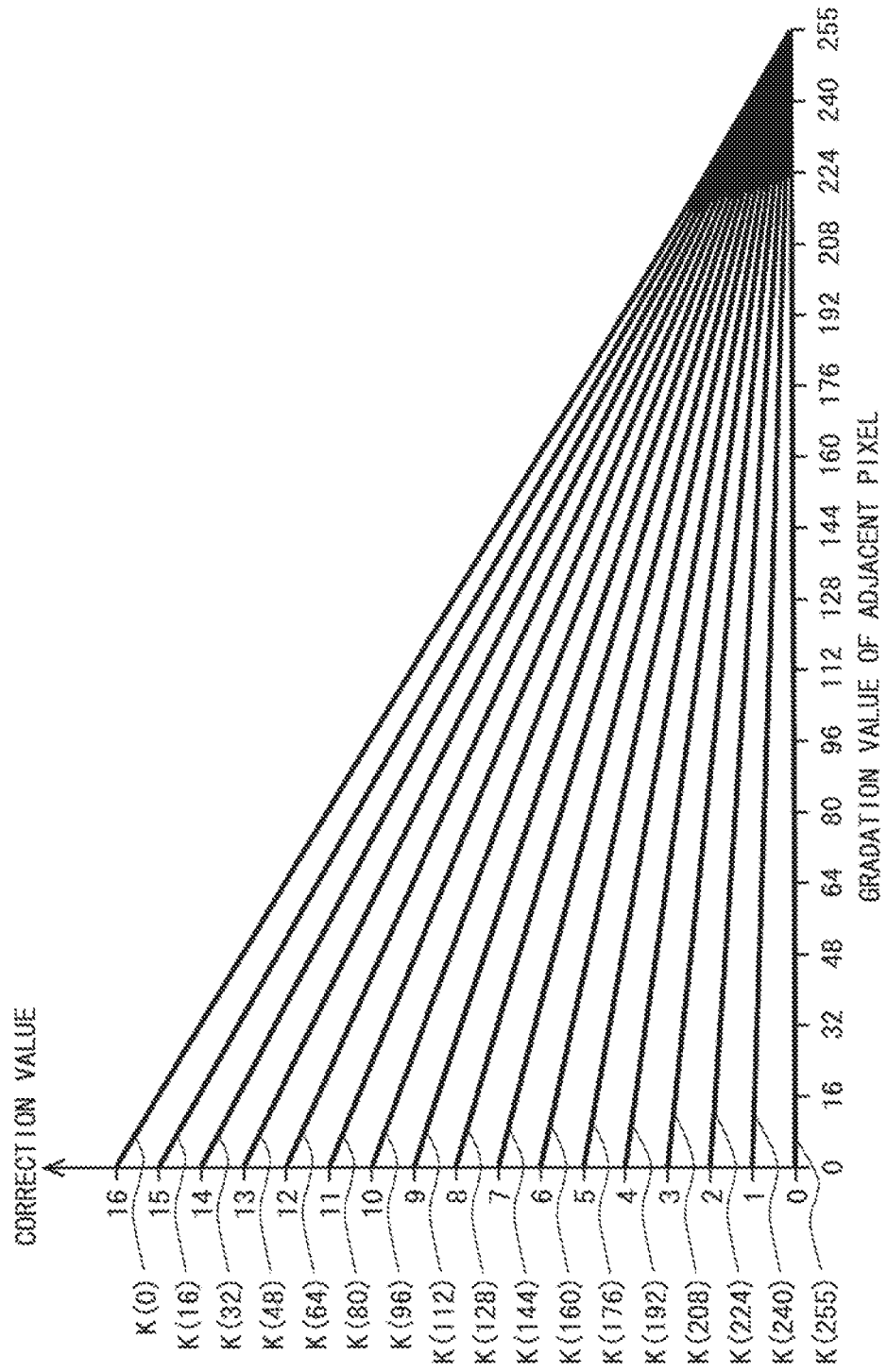
FIG. 7 is a diagram showing a relationship between a gradation value of an adjacent pixel and a correction value in the daytime correction table, for each gradation value of a processing target pixel, regarding the embodiment.

FIG. 7 is a diagram showing a relationship between the gradation value of the adjacent pixel and the correction value in the daytime correction table TB2, for each gradation value of the processing target pixel. As can be seen in FIG. 7, the smaller the gradation value of the adjacent pixel, the relatively greater a correction amount (the absolute value of the correction value), and the smaller the gradation value of the processing target pixel, the relatively greater the correction amount. That is, as described above, the daytime correction table TB2 stores correction values by which the difference between the gradation value after correction and the gradation value before correction is relatively increased as the gradation value of the adjacent pixel becomes smaller, and by which the difference between the gradation value after correction and the gradation value before correction is relatively increased as the gradation value of the processing target pixel becomes smaller.

2.2 Correction of Gradation Value

<2.2.1 Configuration and Operation of Gradation Value Correction Unit>

Figure 8:
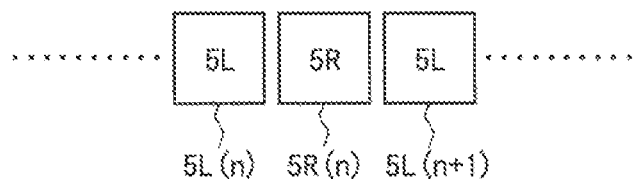
FIG. 8 is a diagram for describing correction of a gradation value according to the embodiment.

Next, correction of a gradation value by the gradation value correction unit will be described in detail. It should be noted that, although a description is given here with respect to the right-image gradation value correction unit 240R, the same also applies to the left-image gradation value correction unit 240L. Furthermore, it is assumed here that an n-th pixel among a plurality of pixels (right-eye pixels) corresponding to the right-image input line buffer 220R is the processing target pixel. Accordingly, as shown in FIG. 8, the processing target pixel is denoted by a reference sign 5R(n), an adjacent pixel on the left of the processing target pixel is denoted by a reference sign 5L(n), and an adjacent pixel on the right of the processing target pixel is denoted by a reference sign 5L(n+1).

Figure 9:
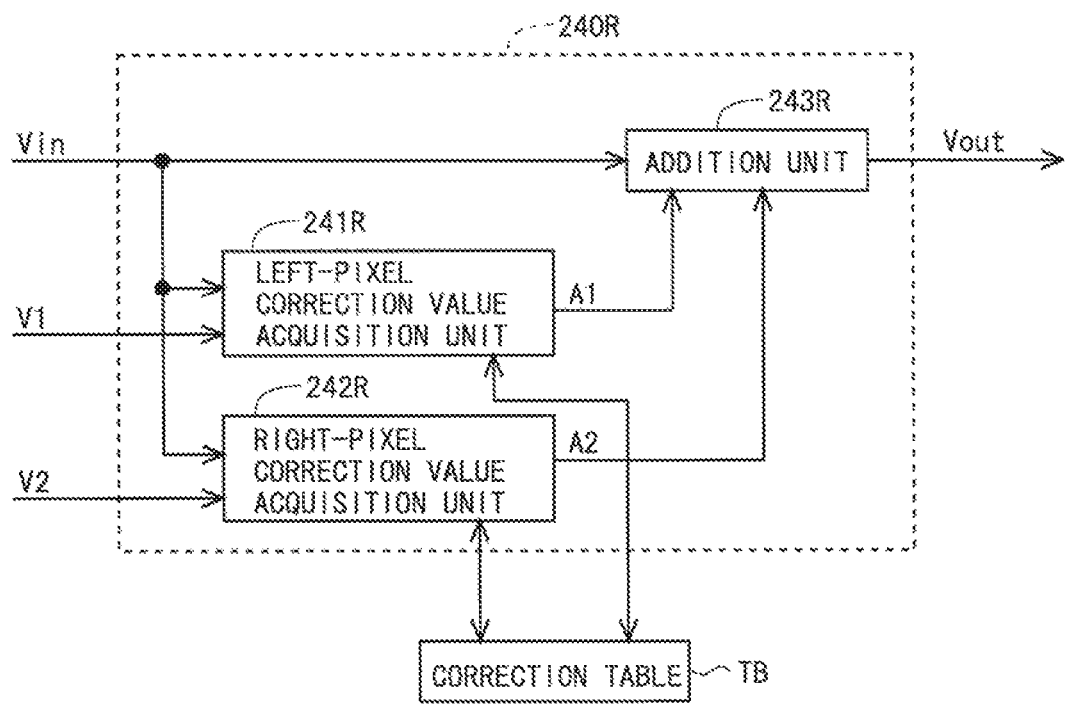
FIG. 9 is a block diagram showing a detailed configuration of a right-image gradation value correction unit according to the embodiment.

FIG. 9 is a block diagram showing a detailed configuration of the right-image gradation value correction unit 240R. As shown in FIG. 9, the right-image gradation value correction unit 240R includes a left-pixel correction value acquisition unit 241R, a right-pixel correction value acquisition unit 242R, and an addition unit 243R. It should be noted that, in FIG. 9, the correction table TB is the nighttime correction table TB1 or the daytime correction table TB2 that is selected by the correction table selection unit 230.

The left-pixel correction value acquisition unit 241R acquires a gradation value (gradation value before correction) Vin of the processing target pixel 5R(n) from the right-image input line buffer 220R, and also acquires a gradation value V1 of the adjacent pixel 5L(n) from the left-image input line buffer 220L. Then, the left-pixel correction value acquisition unit 241R refers to the correction table TB, and acquires a correction value A1 corresponding to the combination of the gradation value Vin of the processing target pixel 5R(n) and the gradation value V1 of the adjacent pixel 5L(n).

The right-pixel correction value acquisition unit 242R acquires the gradation value (gradation value before correction) Vin of the processing target pixel 5R(n) from the right-image input line buffer 220R, and also acquires a gradation value V2 of the adjacent pixel 5L(n+1) from the left-image input line buffer 220L. Then, the right-pixel correction value acquisition unit 242R refers to the correction table TB, and acquires a correction value A2 corresponding to the combination of the gradation value Vin of the processing target pixel 5R(n) and the gradation value V2 of the adjacent pixel 5L(n+1).

The addition unit 243R adds, to the gradation value (gradation value before correction) Vin of the processing target pixel 5R(n), the correction value V1 acquired by the left-pixel correction value acquisition unit 241R and the correction value V2 acquired by the right-pixel correction value acquisition unit 242R. That is, the addition unit 243R determines a gradation value Vout after correction by the following Equation (3). It should be noted that data of the gradation value Vout after correction that is outputted from the addition unit 243R is accumulated in the right-image output line buffer 250R (see FIG. 1).

$$Vout=Vin+V1+V2 \quad (3)$$

<2.2.2 Specific Example of Correction of Gradation Value>

A specific example of correction of a gradation value by the gradation value correction unit will be described. Also in this case, it is assumed that the n-th pixel among a plurality of pixels (right-eye pixels) corresponding to the right-image input line buffer 220R is the processing target pixel 5R(n) (see FIG. 8).

Figure 10:
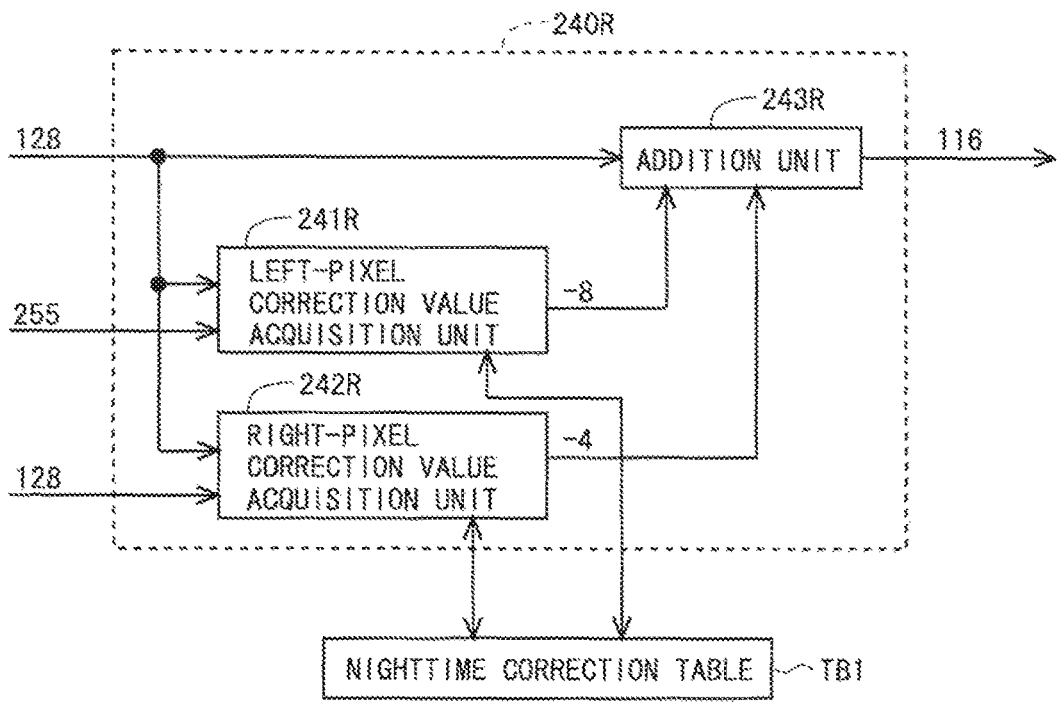
FIG. 10 is a diagram for describing a specific example of correction of a gradation value according to the embodiment.

First, a first example will be described with reference to FIG. 10. It is assumed in the first example that "the nighttime correction table TB1 is selected by the correction table selection unit 230, and the gradation value Vin of the processing target pixel 5R(n), the gradation value V1 of the adjacent pixel 5L(n), and the gradation value V2 of the adjacent pixel 5L(n+1) are 128, 255, and 128, respectively". According to the nighttime correction table TB1 (see FIG. 4), the correction value corresponding to the combination of the gradation value "128" of the processing target pixel 5R(n) and the gradation value "255" of the adjacent pixel 5L(n) is −8. Accordingly, the correction value A1 that is acquired by the left-pixel correction value acquisition unit 241R is −8. Moreover, according to the nighttime correction table TB1, the correction value corresponding to the combination of the gradation value "128" of the processing target pixel 5R(n) and the gradation value "128" of the adjacent pixel 5L(n+1) is −4. Accordingly, the correction value A2 that is acquired by the right-pixel correction value acquisition unit 242R is −4. The addition unit 243R acquires a gradation value after correction "116" by adding the correction value "−8" acquired by the left-pixel correction value acquisition unit 241R and the correction value "−4" acquired by the right-pixel correction value acquisition unit 242R to the gradation value "128" of the processing target pixel 5R(n). In this manner, in this example, the gradation value of the processing target pixel 5R(n) is corrected from 128 to 116.

Figure 11:
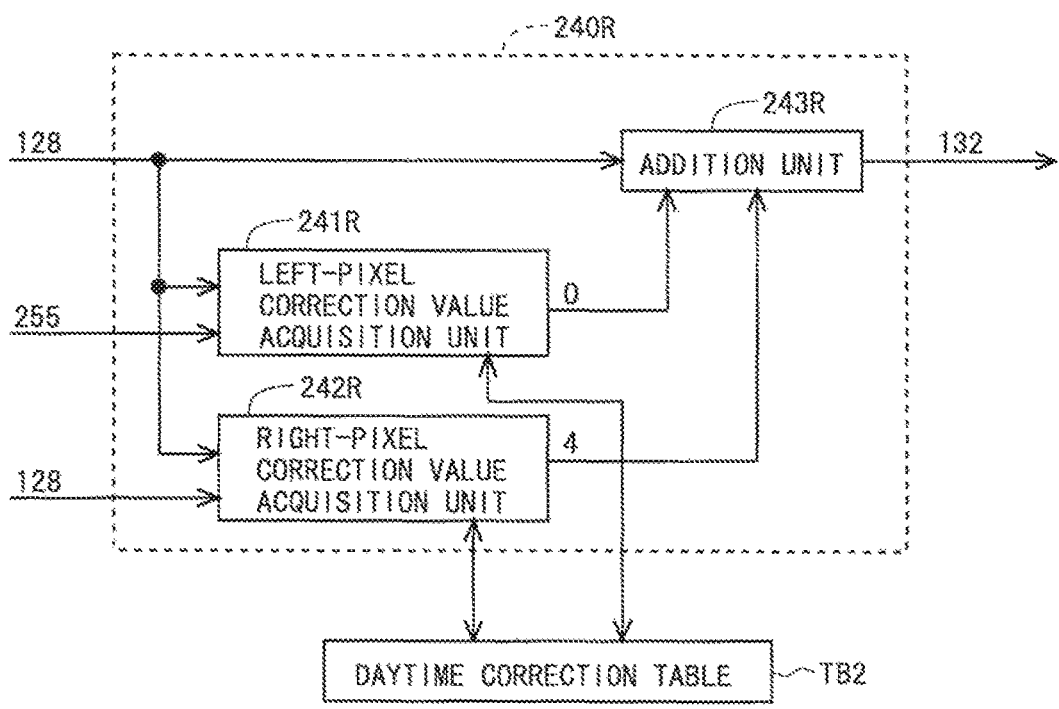
FIG. 11 is a diagram for describing a specific example of correction of a gradation value according to the embodiment.
Figure 12:
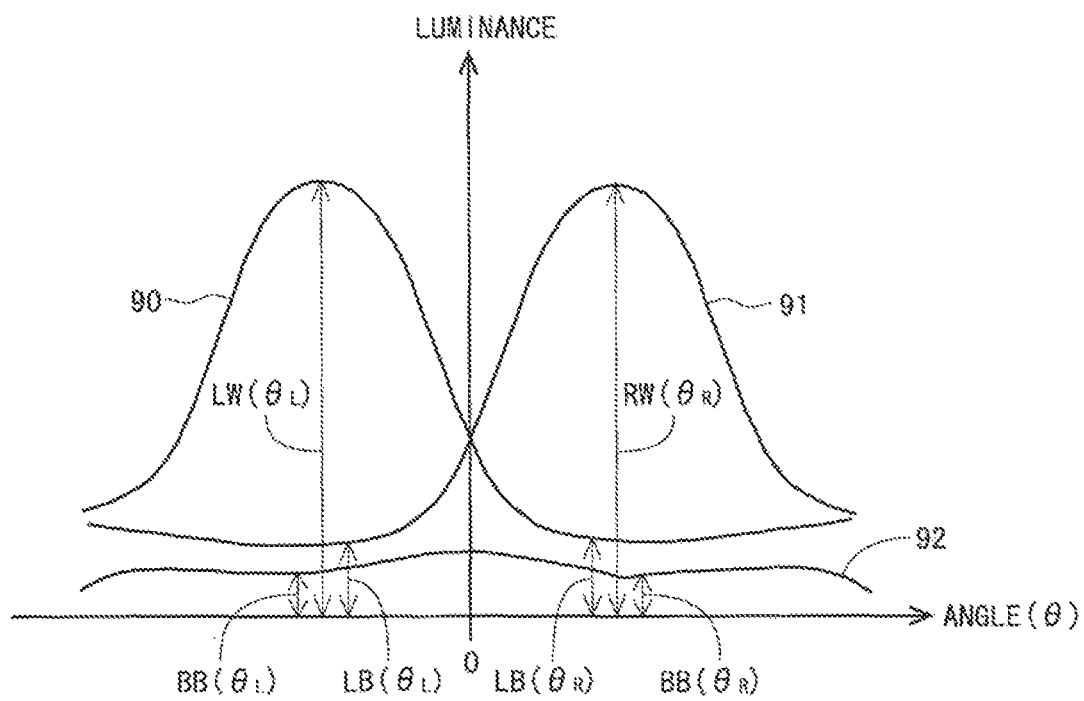
FIG. 12 is a diagram for describing a crosstalk value.
Figure 13:
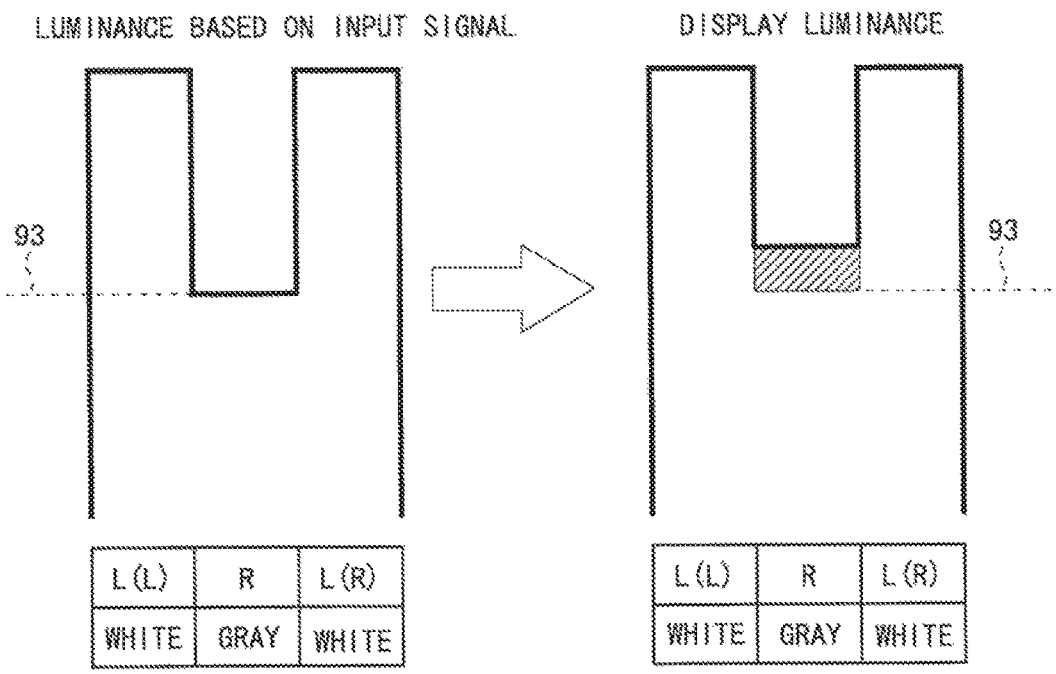
FIG. 13 is a diagram for describing a first correction method of suppressing occurrence of crosstalk.
Figure 14:
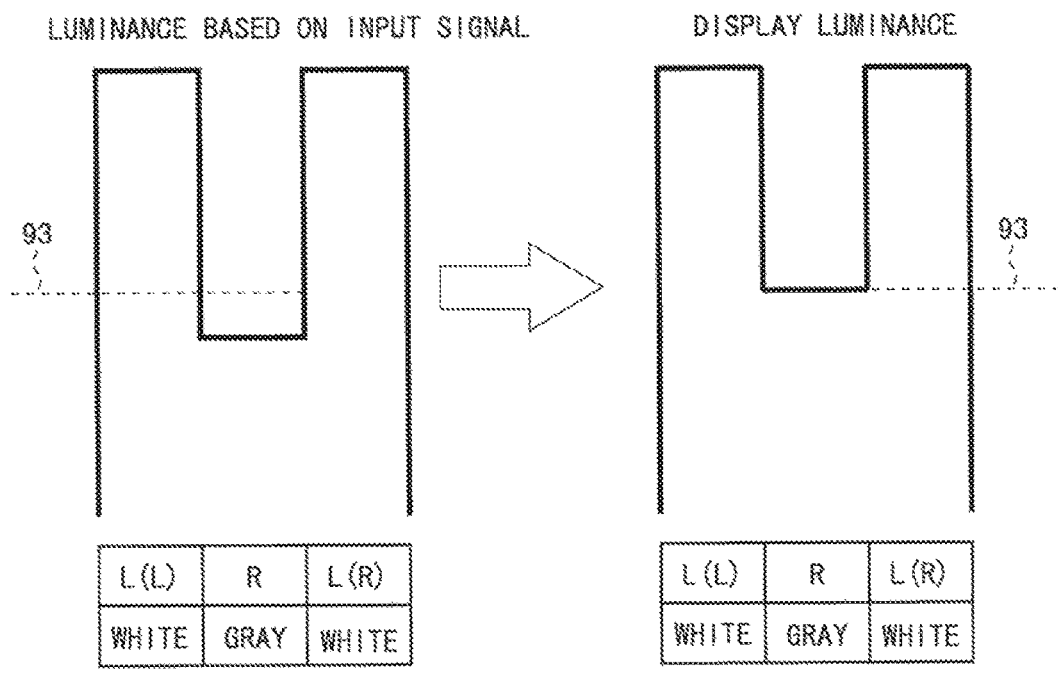
FIG. 14 is a diagram for describing the first correction method of suppressing occurrence of crosstalk.
Figure 15:
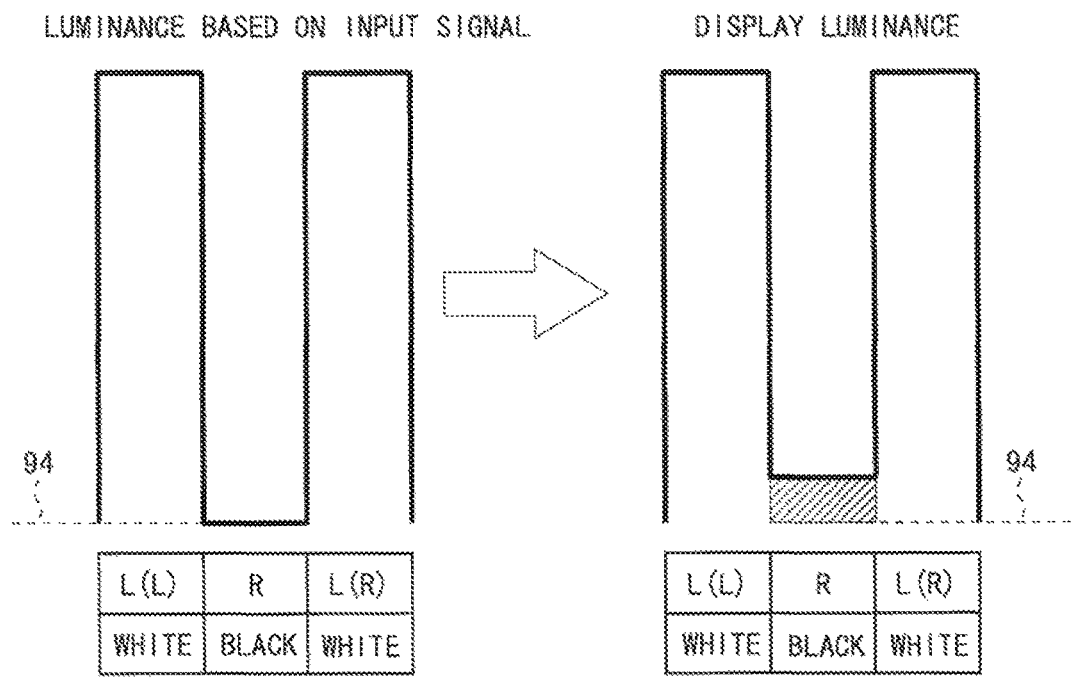
FIG. 15 is a diagram for describing the first correction method of suppressing occurrence of crosstalk.
Figure 16:
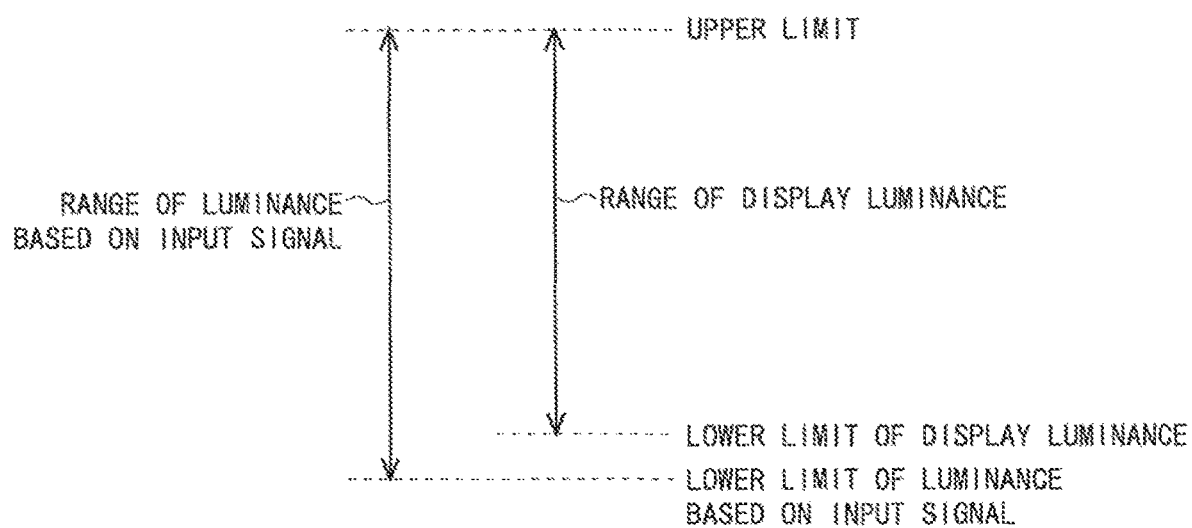
FIG. 16 is a diagram for describing a second correction method of suppressing occurrence of crosstalk.
Figure 17:
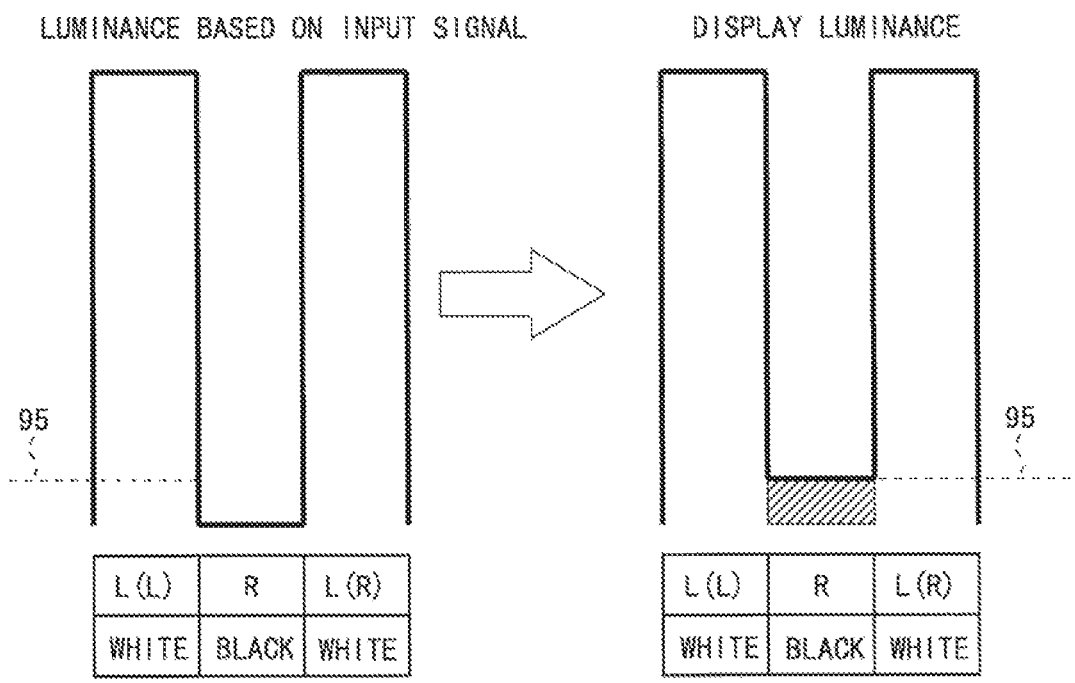
FIG. 17 is a diagram for describing the second correction method of suppressing occurrence of crosstalk.

Next, a second example will be described with reference to FIG. 11. It is assumed in the second example that "the daytime correction table TB2 is selected by the correction table selection unit 230, and the gradation value Vin of the processing target pixel 5R(n), the gradation value V1 of the adjacent pixel 5L(n), and the gradation value V2 of the adjacent pixel 5L(n+1) are 128, 255, and 128, respectively". According to the daytime correction table TB2 (see FIG. 6), the correction value corresponding to the combination of the gradation value "128" of the processing target pixel 5R(n) and the gradation value "255" of the adjacent pixel 5L(n) is 0. Accordingly, the correction value A1 that is acquired by the left-pixel correction value acquisition unit 241R is 0. Moreover, according to the daytime correction table TB2, the correction value corresponding to the combination of the gradation value "128" of the processing target pixel 5R(n) and the gradation value "128" of the adjacent pixel 5L(n+1) is 4. Accordingly, the correction value A2 that is acquired by the right-pixel correction value acquisition unit 242R is 4. The addition unit 243R acquires a gradation value after correction "132" by adding the correction value "0" acquired by the left-pixel correction value acquisition unit 241R and the correction value "4" acquired by the right-pixel correction value acquisition unit 242R to the gradation value "128" of the processing target pixel 5R(n). In this manner, in this example, the gradation value of the processing target pixel 5R(n) is corrected from 128 to 132.

It can be grasped from above that the gradation value of the processing target pixel is corrected to different values between the case where the nighttime correction table TB1 is selected and the case where the daytime correction table TB2 is selected. With respect to this point, when the nighttime correction table TB1 is selected, the gradation value after correction becomes equal to the gradation value before correction or becomes smaller than the gradation value before correction. On the other hand, when the daytime correction table TB2 is selected, the gradation value after correction becomes equal to the gradation value before correction or becomes greater than the gradation value before correction.

It should be noted that, in the nighttime correction table TB1 shown in FIG. 4 and the daytime correction table TB2 shown in FIG. 6, only data of every sixteenth gradation value is stored both for the processing target pixel and for the adjacent pixel. With respect to this point, in the case where data of the gradation value of the processing target pixel or the adjacent pixel is not stored in the correction table, the correction value may be determined by using data that is closest to the target gradation value among data of the gradation values stored in the correction table, or the correction value may be calculated by performing linear interpolation by using data of the gradation values stored in the correction table.

A description is given above citing examples of relatively simple correction tables (the nighttime correction table TB1 and the daytime correction table TB2), but in reality, a correction table depending on a property of an employed liquid crystal panel has to be created and used. Furthermore, complex correction of the gradation value may be performed using the correction table. For example, correction may be performed in such a manner that "when the daytime correction table TB2 is selected, the gradation value after correction becomes greater than the gradation value before correction for a black part, and the gradation value after correction becomes smaller than the gradation value before correction for a white part".

2.3 Switching of Correction Table

As described above, the correction table selection unit 230 selects one of the nighttime correction table TB1 or the daytime correction table TB2 depending on conditions. That is, switching of the correction table is performed depending on conditions. With respect to this point, in the present embodiment, switching of the correction table is performed based on whether a light of a vehicle where this liquid crystal display device is mounted is on or not. To realize this, the liquid crystal display device is configured such that a state of the light of the vehicle is given to the correction table selection unit 230 as a switching signal SW. When the switching signal SW indicates that the light of the vehicle is on, the correction table selection unit 230 selects the nighttime correction table TB1, and when the switching signal SW indicates that the light of the vehicle is off, the correction table selection unit 230 selects the daytime correction table TB2. Accordingly, in a dark environment, the gradation value is corrected using the nighttime correction table TB1, and in a bright environment, the gradation value is corrected using the daytime correction table TB2. In this manner, in the dark environment, the first correction method described above is adopted as the method of suppressing occurrence of crosstalk, and in the bright environment, the second correction method described above is adopted as the method of suppressing occurrence of crosstalk.

It should be noted that correction values that take into account the property of individual liquid crystal display device are stored in the correction tables (the nighttime correction table TB1 and the daytime correction table TB2). That is, the configuration of the present embodiment may be applied to various liquid crystal display devices by simply replacing the correction tables.

3. Advantageous Effects

According to the present embodiment, the liquid crystal display device holds two correction tables (the nighttime correction table TB1 and the daytime correction table TB2) as the tables for correcting the gradation value to suppress occurrence of crosstalk. The nighttime correction table TB1 stores correction values such that occurrence of crosstalk is effectively suppressed at a part other than a black part without causing a phenomenon called "black floating". The daytime correction table TB2 stores correction values such that occurrence of crosstalk is suppressed also at the black part, although the contrast is reduced. Under such a configuration, the correction table used at the time of correcting the gradation value is switched depending on conditions (environment of the liquid crystal display device). Specifically, the nighttime correction table TB1 is used when the light of the vehicle where the liquid crystal display device is mounted is on, and the daytime correction table TB2 is used when the light is off. Accordingly, in a bright environment, occurrence of crosstalk is suppressed at any gradation part. In a dark environment, occurrence of crosstalk is suppressed, without causing the phenomenon called "black floating", which causes reduction in an image quality. Therefore, according to the present embodiment, in the liquid crystal display device having the function of displaying a stereoscopic image, occurrence of crosstalk can be more effectively suppressed than in a conventional case.

4. Modification Example

In the above-described embodiment, switching of the correction table is performed based on whether the light of the vehicle is on or not. However, the present invention is not limited to this. In the following, modification examples will be described with respect to switching of the correction table.

4.1 First Modification Example

In a present modification example, switching of the correction table is performed based on time. Specifically, the nighttime correction table TB1 is used during hours from sunset to sunrise, and the daytime correction table TB2 is used during hours from sunrise to sunset. That is, the correction table selection unit 230 selects the nighttime correction table TB1 during hours from sunset to sunrise, and selects the daytime correction table TB2 during hours from sunrise to sunset.

It should be noted that the time of sunset and the time of sunrise may be acquired from a site providing such information, or may be calculated from a current date and latitude/longitude of a current position, for example. Furthermore, switching of the correction table may be performed based on two fixed time points, without using the time of sunset and sunrise. For example, the configuration may be such that the nighttime correction table TB1 is used in a period from six in the afternoon to six in the morning and the daytime correction table TB2 is used in a period from six in the morning to six in the afternoon.

4.2 Second Modification Example

In a present modification example, switching of the correction table is performed based on brightness of surroundings of the liquid crystal display device (image display device). In outline, the nighttime correction table TB1 is used when the surroundings of the liquid crystal display device are dark, and the daytime correction table TB2 is used when the surroundings of the liquid crystal display device are bright. To realize this, the liquid crystal display device according to the present modification example is provided with an illuminance sensor (illuminance detection unit) for detecting illuminance indicating the surrounding brightness. When the illuminance detected by the illuminance sensor is smaller than a predetermined threshold, the correction table selection unit 230 selects the nighttime correction table TB1, and when the illuminance detected by the illuminance sensor is greater than the predetermined threshold, the correction table selection unit 230 selects the daytime correction table TB2.

4.3 Third Modification Example

Generally, a liquid crystal display device is provided with means (screen luminance adjustment unit) for adjusting brightness (i.e., screen luminance) of the display unit 50. In the present modification example, switching of the correction table is performed based on the screen luminance. In outline, the nighttime correction table TB1 is used when the screen luminance is low, and the daytime correction table TB2 is used when the screen luminance is high. Specifically, when the screen luminance is set by the screen luminance adjustment unit to a value smaller than a predetermined threshold, the correction table selection unit 230 selects the nighttime correction table TB1, and when the screen luminance is set by the screen luminance adjustment unit to a value greater than the predetermined threshold, the correction table selection unit 230 selects the daytime correction table TB2.

5. Others

The present invention is not limited to the above-described embodiment and the above-described modification examples, and various modifications may be made without departing from the gist of the present invention. For example, although the crosstalk correction processing unit 20 is provided at the previous stage of the display control circuit 30 as shown in FIG. 2 in the above-described embodiment, the present invention is not limited to this, and the function of the crosstalk correction processing unit 20 may be provided in an IC implementing the display control circuit 30. Furthermore, for example, although the above-described embodiment uses two correction tables (the nighttime correction table TB1 and the daytime correction table TB2), the present invention is not limited to this, and the configuration may be such that three or more correction tables are prepared in advance and switching of the correction table to be actually used is performed depending on various conditions.

Heretofore, the present invention has been described in detail, but the description given above is illustrative in all aspects, rather than restrictive. It is therefore understood that numerous changes and modifications can be devised without departing from the scope of the present invention.

What is claimed is:

1. An image display device including a display unit including a plurality of right-eye pixels for displaying a right-eye image and a plurality of left-eye pixels for displaying a left-eye image, the image display device being for displaying a stereoscopic image based on image data including gradation values of a plurality of pixels including the plurality of right-eye pixels and the plurality of left-eye pixels, the image display device comprising:
   a plurality of correction tables storing correction values corresponding to combinations of a gradation value of a processing target pixel and a gradation value of an adjacent pixel that is a pixel adjacent to the processing target pixel;
   a correction table selection unit configured to select one correction table from the plurality of correction tables depending on conditions; and
   a gradation value correction unit configured to take the plurality of pixels one by one as the processing target pixel, and to correct the gradation value of the processing target pixel based on the correction table selected by the correction table selection unit, wherein
   the plurality of correction tables include a first correction table and a second correction table,
   the first correction table and the second correction table correspond respectively to one and other of two methods of suppressing crosstalk at a time of display of the stereoscopic image on the display unit,
   the first correction table stores a correction value such that a gradation value after correction becomes equal to or smaller than the gradation value before correction, a difference between an absolute value of the gradation value after correction and an absolute value of the gradation value before correction becomes greater as the gradation value of the adjacent pixel becomes greater, and the difference between an absolute value of the gradation value after correction and an absolute value of the gradation value before correction becomes greater as the gradation value of the processing target pixel becomes greater,
   the second correction table stores a correction value such that the gradation value after correction becomes equal to or greater than the gradation value before correction, the difference between an absolute value of the gradation value after correction and an absolute value of the gradation value before correction becomes greater as the gradation value of the adjacent pixel becomes smaller, and the difference between an absolute value of the gradation value after correction and an absolute value of the gradation value before correction becomes greater as the gradation value of the processing target pixel becomes smaller,
   the image display device is mounted in a vehicle, and
   the correction table selection unit selects the first correction table when a light of the vehicle is on, and selects the second correction table when the light of the vehicle is off.

2. An image display device including a display unit including a plurality of right-eye pixels for displaying a right-eye image and a plurality of left-eye pixels for displaying a left-eye image, the image display device being for displaying a stereoscopic image based on image data including gradation values of a plurality of pixels including the plurality of right-eye pixels and the plurality of left-eye pixels, the image display device comprising:
   a plurality of correction tables storing correction values corresponding to combinations of a gradation value of a processing target pixel and a gradation value of an adjacent pixel that is a pixel adjacent to the processing target pixel;
   a correction table selection unit configured to select one correction table from the plurality of correction tables depending on conditions; and
   a gradation value correction unit configured to take the plurality of pixels one by one as the processing target pixel, and to correct the gradation value of the processing target pixel based on the correction table selected by the correction table selection unit, wherein
   the plurality of correction tables include a first correction table and a second correction table,
   the first correction table and the second correction table correspond respectively to one and other of two methods of suppressing crosstalk at a time of display of the stereoscopic image on the display unit,
   the first correction table stores a correction value such that a gradation value after correction becomes equal to or smaller than the gradation value before correction, a difference between an absolute value of the gradation value after correction and an absolute value of the gradation value before correction becomes greater as the gradation value of the adjacent pixel becomes greater, and the difference between an absolute value of the gradation value after correction and an absolute value of the gradation value before correction becomes greater as the gradation value of the processing target pixel becomes greater,
   the second correction table stores a correction value such that the gradation value after correction becomes equal to or greater than the gradation value before correction, the difference between an absolute value of the gradation value after correction and an absolute value of the gradation value before correction becomes greater as the gradation value of the adjacent pixel becomes smaller, and the difference between an absolute value of the gradation value after correction and an absolute value of the gradation value before correction becomes greater as the gradation value of the processing target pixel becomes smaller, and the correction table selection unit selects the first correction table during hours from sunset to sunrise, and selects the second correction table during hours from sunrise to sunset.

3. An image display device including a display unit including a plurality of right-eye pixels for displaying a right-eye image and a plurality of left-eye pixels for displaying a left-eye image, the image display device being for displaying a stereoscopic image based on image data including gradation values of a plurality of pixels including the plurality of right-eye pixels and the plurality of left-eye pixels, the image display device comprising:

a plurality of correction tables storing correction values corresponding to combinations of a gradation value of a processing target pixel and a gradation value of an adjacent pixel that is a pixel adjacent to the processing target pixel;

a correction table selection unit configured to select one correction table from the plurality of correction tables depending on conditions;

a gradation value correction unit configured to take the plurality of pixels one by one as the processing target pixel, and to correct the gradation value of the processing target pixel based on the correction table selected by the correction table selection unit; and an illuminance detection unit configured to detect illuminance indicating surrounding brightness, wherein the plurality of correction tables include a first correction table and a second correction table, the first correction table and the second correction table correspond respectively to one and other of two methods of suppressing crosstalk at a time of display of the stereoscopic image on the display unit, the first correction table stores a correction value such that a gradation value after correction becomes equal to or smaller than the gradation value before correction, a difference between an absolute value of the gradation value after correction and an absolute value of the gradation value before correction becomes greater as the gradation value of the adjacent pixel becomes greater, and the difference between an absolute value of the gradation value after correction and an absolute value of the gradation value before correction becomes greater as the gradation value of the processing target pixel becomes greater, the second correction table stores a correction value such that the gradation value after correction becomes equal to or greater than the gradation value before correction, the difference between an absolute value of the gradation value after correction and an absolute value of the gradation value before correction becomes greater as the gradation value of the adjacent pixel becomes smaller, and the difference between an absolute value of the gradation value after correction and an absolute value of the gradation value before correction becomes greater as the gradation value of the processing target pixel becomes smaller, and the correction table selection unit selects the first correction table when the illuminance detected by the illuminance detection unit is smaller than a predetermined threshold, and selects the second correction table when the illuminance detected by the illuminance detection unit is greater than the predetermined threshold.

\* \* \* \* \*